United States Patent
Steinberg et al.

(10) Patent No.: US 10,108,446 B1
(45) Date of Patent: Oct. 23, 2018

(54) LATE LOAD TECHNIQUE FOR DEPLOYING A VIRTUALIZATION LAYER UNDERNEATH A RUNNING OPERATING SYSTEM

(71) Applicant: FireEye, Inc., Milpitas, CA (US)

(72) Inventors: Udo Steinberg, Braunschweig (DE); Neeraj Sanjeev Kulkarni, Santa Clara, CA (US)

(73) Assignee: FireEye, Inc., Milpitas, CA (US)

( * ) Notice: Subject to any disclaimer, the term of this patent is extended or adjusted under 35 U.S.C. 154(b) by 29 days.

(21) Appl. No.: 15/229,770

(22) Filed: Aug. 5, 2016

Related U.S. Application Data

(60) Provisional application No. 62/266,129, filed on Dec. 11, 2015.

(51) Int. Cl.
*G06F 12/00* (2006.01)
*G06F 9/455* (2018.01)
(Continued)

(52) U.S. Cl.
CPC ...... *G06F 9/45558* (2013.01); *G06F 12/1009* (2013.01); *G06F 12/1027* (2013.01);
(Continued)

(58) Field of Classification Search
CPC ............. G06F 9/45558; G06F 12/1009; G06F 2009/45583; G06F 2212/657
See application file for complete search history.

(56) References Cited

U.S. PATENT DOCUMENTS 8,201,246 B1   6/2012   Wu et al.
8,271,978 B2   9/2012   Bennett et al.
(Continued)

FOREIGN PATENT DOCUMENTS

WO   WO2012/135192   10/2012
WO   WO2012/154664   11/2012
(Continued)

OTHER PUBLICATIONS

Amiri Sani, Ardalan, et al. "I/O paravirtualization at the device file boundary." ACM SIGPLAN Notices 49.4 (2014), pp. 319-332.
(Continued)

*Primary Examiner* — Nanci N Wong
(74) *Attorney, Agent, or Firm* — Rutan & Tucker, LLP

(57) ABSTRACT

A late load technique deploys a virtualization layer underneath an operating system executing on a node of a network environment to enable the virtualization layer to control the operating system. Binary executable files (binaries) for the virtualization layer may be included in a ring 0 driver loaded in memory of the node with the highest privilege level (e.g., host mode ring 0) needed to control the guest operating system. The ring 0 driver may request allocation of physical memory from the guest operating system for the virtualization layer and thereafter suspend the guest operating system and hardware resources of the node in a deterministic manner. The ring 0 driver may capture architectural states of those resources, which are used to create a virtual machine and virtual devices having initial states that are substantially identical to the states of the operating system and hardware resources at the time of suspension. The ring 0 driver may then load the binaries of the virtualization layer in the allocated memory, bootstrap the virtualization layer to create the virtual machine, initialize the virtual devices and restart the devices in the virtual machine environment with the captured architectural states.

20 Claims, 6 Drawing Sheets

(51) Int. Cl.
*G06F 12/1027* (2016.01)
*G06F 12/1009* (2016.01)

(52) U.S. Cl.
CPC .............. *G06F 2009/45583* (2013.01); *G06F 2212/657* (2013.01)

(56) References Cited

U.S. PATENT DOCUMENTS

| | | |
|---|---|---|
| 8,387,046 B1 | 2/2013 | Montague |
| 8,479,276 B1 | 7/2013 | Vaystikh et al. |
| 8,479,286 B2 | 7/2013 | Dalcher et al. |
| 8,479,292 B1 | 7/2013 | Li et al. |
| 8,522,236 B2 | 8/2013 | Zimmer et al. |
| 8,775,715 B2 | 7/2014 | Tsirkin et al. |
| 8,832,352 B2 | 9/2014 | Tsirkin et al. |
| 8,839,245 B1 | 9/2014 | Khajuria et al. |
| 9,003,402 B1 | 4/2015 | Carbone et al. |
| 9,092,625 B1 | 7/2015 | Kashyap |
| 2003/0120856 A1 | 6/2003 | Neiger et al. |
| 2005/0216759 A1 | 9/2005 | Rothman et al. |
| 2006/0130060 A1 | 6/2006 | Anderson et al. |
| 2006/0248528 A1 | 11/2006 | Oney et al. |
| 2007/0174915 A1 | 7/2007 | Gribble et al. |
| 2007/0180454 A1 | 8/2007 | Fujimoto et al. |
| 2007/0300227 A1 | 12/2007 | Mall et al. |
| 2008/0028124 A1 | 1/2008 | Tago |
| 2008/0065854 A1 | 3/2008 | Schoenberg et al. |
| 2008/0244206 A1 | 10/2008 | Heo et al. |
| 2008/0294808 A1 | 11/2008 | Mahalingam et al. |
| 2009/0106754 A1 | 4/2009 | Liu et al. |
| 2009/0172661 A1 | 7/2009 | Zimmer et al. |
| 2010/0023810 A1 | 1/2010 | Stolfo et al. |
| 2010/0031360 A1 | 2/2010 | Seshadri |
| 2010/0254622 A1 | 10/2010 | Kamay et al. |
| 2010/0299665 A1 | 11/2010 | Adams |
| 2011/0004935 A1 | 1/2011 | Moffie et al. |
| 2011/0047542 A1 | 2/2011 | Dang et al. |
| 2011/0047544 A1 | 2/2011 | Yehuda et al. |
| 2011/0153909 A1 | 6/2011 | Dong |
| 2011/0167422 A1 | 7/2011 | Eom et al. |
| 2011/0296412 A1 | 12/2011 | Banga et al. |
| 2011/0314546 A1 | 12/2011 | Aziz et al. |
| 2012/0047580 A1 | 2/2012 | Smith et al. |
| 2012/0254995 A1 | 10/2012 | Sallam |
| 2012/0255002 A1 | 10/2012 | Sallam |
| 2012/0255016 A1 | 10/2012 | Sallam |
| 2012/0255017 A1 | 10/2012 | Sallam |
| 2012/0255021 A1 | 10/2012 | Sallam |
| 2012/0311708 A1 | 12/2012 | Agarwal et al. |
| 2013/0031374 A1 | 1/2013 | Thom et al. |
| 2013/0055256 A1 | 2/2013 | Banga et al. |
| 2013/0145055 A1* | 6/2013 | Kegel ............... G06F 13/28 710/26 |
| 2013/0145471 A1 | 6/2013 | Richard et al. |
| 2013/0191924 A1 | 6/2013 | Tedesco et al. |
| 2013/0174147 A1 | 7/2013 | Sahita |
| 2013/0227680 A1 | 8/2013 | Pavlyushchik |
| 2013/0282776 A1 | 10/2013 | Durrant et al. |
| 2013/0283370 A1 | 10/2013 | Vipat |
| 2013/0305006 A1 | 11/2013 | Altman et al. |
| 2013/0312099 A1 | 11/2013 | Edwards |
| 2013/0333033 A1 | 12/2013 | Khesin |
| 2013/0346966 A1 | 12/2013 | Natu et al. |
| 2013/0347131 A1 | 12/2013 | Mooring et al. |
| 2014/0115652 A1 | 4/2014 | Kapoor |
| 2014/0351810 A1 | 11/2014 | Pratt |
| 2015/0199514 A1 | 7/2015 | Tosa |
| 2015/0199532 A1 | 7/2015 | Ismael |
| 2016/0055017 A1* | 2/2016 | Beveridge ........... G06F 9/45558 718/1 |
| 2016/0110291 A1* | 4/2016 | Gordon ................. G06F 12/126 711/6 |
| 2016/0246730 A1* | 8/2016 | Gandhi ............. G06F 12/1009 |

FOREIGN PATENT DOCUMENTS

| | | |
|---|---|---|
| WO | WO-2012/177464 A1 | 12/2012 |
| WO | WO-2013/091221 A1 | 6/2013 |
| WO | WO-2014/004747 A2 | 1/2014 |

OTHER PUBLICATIONS

"Bromium vSentry—Defeat the Unknown Attack," Oct. 10, 2013, 11 pages.
Bromium Corp, "Bromium vSentry, Defeat of the Unknown Attack," downloaded from http://www.bromium.com/sites/default/files/Bromium-Whitepaper-vSentry_2.pdf on Dec. 1, 2013.
Bromium Corp, "Live Attack Visualization and Analysis, What does a Malware attack look like?" http://www.bromium.com/sites/default/files/Bromium%2OLAVA%20WP_2.pdf on Dec. 1, 2013.
Chen, Peter M., and Brian D. Noble. "When virtual is better than real [operating system relocation to virtual machines]." Hot Topics in Operating Systems, 2001. Proceedings of the Eighth Workshop on. IEEE, 2001.
Gao, Debin, Michael K. Reiter, and Dawn Xiaodong Song. "On Gray-Box Program Tracking for Anomaly Detection." USENIX security symposium. 2004.
Garfinkel, Tal, and Mendel Rosenblum. "A Virtual Machine Introspection Based Architecture for Intrusion Detection." NDSS. 2003.
Heiser, Gernot, and Ben Leslie. "The OKL4 Microvisor: Convergence point of microkernels and hypervisors." Proceedings of the first ACM asia-pacific workshop on Workshop on systems. ACM, 2010.
Hewlett Packard et al, "Advanced Configuration and Power Interface Specification," pp. 31-54, and 607-624, Nov. 13, 2013.
Hofmeyr, Steven A., Stephanie Forrest, and Anil Somayaji. "Intrusion detection using sequences of system calls." Journal of computer security 6.3 (1998): 151-180.
Huang, Yih, et al. "Efficiently tracking application interactions using lightweight virtualization." Proceedings of the 1st ACM workshop on Virtual machine security. ACM, 2008.
Iqbal, Asif, Nayeema Sadeque, and Rafika Ida Mutia. "An overview of microkernel, hypervisor and microvisor virtualization approaches for embedded systems." Report, Department of Electrical and Information Technology, Lund University, Sweden 2110 (2009), 15 Pages.
Iqbal, et al., - "An Overview of Microkernel, Hypervisor and Microvisor Virtualization Approaches for Embedded Systems," Department of Electrical and Information Technology, Lund University, Sweden, Aug. 26, 2013, 15 pages.
Jiang, Xuxian, Xinyuan Wang, and Dongyan Xu. "Stealthy malware detection through vmm-based out-of-the-box semantic view reconstruction." Proceedings of the 14th ACM conference on Computer and communications security. ACM, 2007.
Jones, Stephen T., Andrea C. Arpaci-Dusseau, and Remzi H. Arpaci-Dusseau. "Antfarm: Tracking Processes in a Virtual Machine Environment." USENIX Annual Technical Conference, General Track. 2006.
Kapravelos, Alexandros, et al. "Revolver: An Automated Approach to the Detection of Evasive Web-based Malware." USENIX Security Symposium. 2013.
King, Samuel T., and Peter M. Chen. "SubVirt: Implementing malware with virtual machines." Security and Privacy, 2006 IEEE Symposium on. IEEE, 2006, 14 Pages.
Kosoresow, Andrew P., and Steven A. Hofmeyr. "Intrusion detection via system call traces." IEEE software 14.5 (1997): 35-42.
Laureano, Marcos, Carlos Maziero, and Edgard Jamhour. "Intrusion detection in virtual machine environments." Euromicro Conference, 2004. Proceedings. 30th. IEEE, 2004.
Levin, Thomas E., Cynthia E. Irvine, and Thuy D. Nguyen. Least privilege in separation kernels. Naval Postgraduate School Monterey CA Dept of Computer Science, 2006.
Nguyen, Anh M., et al. "Mavmm: Lightweight and purpose built vmm for malware analysis." Computer Security Applications Conference, 2009. ACSAC'09. Annual. IEEE, 2009.

(56) References Cited

OTHER PUBLICATIONS

PCT Notification of Transmittal of the International Search Report and the Written Opinion of the International Searching Authority, or the Declaration, International Searching Authority, International Application No. PCT/US2014/071847, dated Mar. 26, 2015, 16 pages.

PCT Notification of Transmittal of the International Search Report and the Written Opinion of the International Searching Authority, or the Declaration, International Searching Authority, International Application No. PCT/US2014/071879, dated Apr. 28, 2015, 12 pages.

PCT Notification of Transmittal of the International Search Report and the Written Opinion of the International Searching Authority, or the Declaration, International Searching Authority, International Application No. PCT/US2014/071923, dated Mar. 26, 2015, 13 pages.

Steinberg, Udo, and Bernhard Kauer. "NOVA: a microhypervisor-based secure virtualization architecture." Proceedings of the 5th European conference on Computer systems. ACM, 2010, 14 Pages.

Stumpf, Frederic, et al. "An approach to a trustworthy system architecture using virtualization." Autonomic and trusted computing. Springer Berlin Heidelberg, 2007. 191-202.

Sun, Kun, et al. "SecureSwitch: BIOS-Assisted Isolation and Switch between Trusted and Untrusted Commodity OSes." George Mason Feb. 26, 2013, 15 Pages.

Wojtczuk, Rafal. "Subverting the Xen hypervisor." Black Hat USA 2008 (2008), 9 Pages.

Yan, Lok Kwong, et al. "Transparent and Extensible Malware Analysis by Combining Hardware Virtualization and Software Emulation." Internet Society, 2010. Downloaded from https://www.internetsociety.org/sites/default/files/05_1.pdf.

\* cited by examiner

LATE LOAD TECHNIQUE FOR DEPLOYING A VIRTUALIZATION LAYER UNDERNEATH A RUNNING OPERATING SYSTEM

RELATED APPLICATION

The present application claims priority from commonly owned Provisional Patent Application No. 62/266,129, entitled LATE LOAD TECHNIQUE FOR DEPLOYING A VIRTUALIZATION LAYER UNDERNEATH A RUNNING OPERATING SYSTEM, filed on Dec. 11, 2015, the contents of which are incorporated herein by reference.

BACKGROUND

Technical Field

The present disclosure relates to virtualization systems having virtualization layers and, more specifically, to deployment of a virtualization layer underneath an operating system.

Background Information

Data communication in a network involves the exchange of data between two or more entities interconnected by communication links and sub-networks (segments). The entities are typically software processes executing in operating systems of computers, such as endpoint nodes (endpoints) and intermediate nodes. The intermediate nodes interconnect the communication links and segments to enable transmission of data between the endpoints. A local area network (LAN) is an example of segment that provides relatively short distance communication among the interconnected nodes, whereas a wide area network (WAN) enables long distance communication over links provided by telecommunications facilities. The Internet is an example of a WAN that connects disparate computer networks throughout the world, providing global communication between nodes on various networks.

Malicious software (malware) has become a pervasive problem for nodes coupled to networks, such as the Internet. Malware is often embedded within downloadable content intended to adversely influence or attack normal operations of a node. Whereas operating system vulnerabilities have traditionally been common targets of such malware content, attackers have broadened their attack to exploit vulnerabilities in processes or applications, such as web browsers. For example, malware content may be embedded within objects associated with a web page hosted by a malicious web site.

Various types of security enhanced nodes are often deployed at different segments of the networks. These nodes often employ virtualization systems having virtualization layers to provide enhanced security needed to uncover the presence of malware embedded within ingress content propagating over the different segments. Often, the virtualization system is created by loading the virtualization layer on native hardware of the node, such as an endpoint, prior to loading of an operating system within a virtual machine of the node. However, such a configuration usually requires installing the operating system on the virtual machine that is already configured for the native hardware. Often the operating system is previously installed and running on the native hardware such that it is desirable to deploy (i.e., "slip") the virtualization layer underneath the previously installed operating system (e.g., while the operating system is running on the native hardware) and, thereafter during runtime, move the operating system from the native hardware to a virtual machine on the node. In this manner, the benefits of enhanced security from virtualization may be obtained without disturbing any existing operating system configuration, such as software applications and device drivers.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
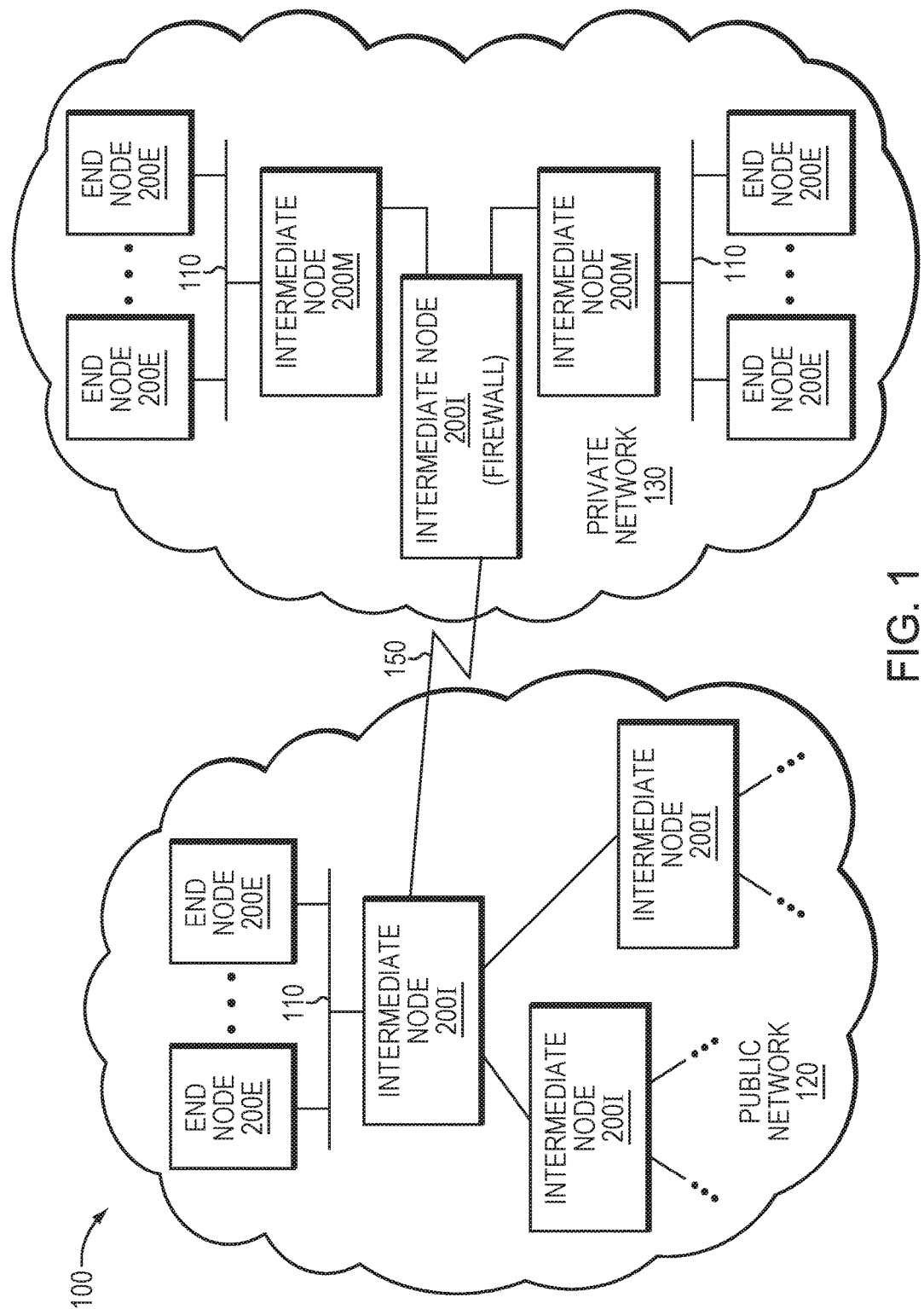
FIG. 1 is a block diagram of a network environment that may be advantageously used with one or more embodiments described herein.

The embodiments described herein provide a late load technique for deploying a virtualization layer underneath an operating system executing on a node of a network environment to enable the virtualization layer to enhance security of the operating system. To deploy the underlying virtualization layer, a ring 0 driver (e.g., a kernel module or kernel mode driver) having a highest privilege level of the operating system (hereinafter "guest operating system") is loaded in a memory of the node. Binary executable files (binaries) for the virtualization layer may be included in the ring 0 driver (i.e., binaries executed in the virtualization layer and not executed in the ring 0 driver). Once loaded, the ring 0 driver may request allocation of physical memory from the guest operating system for the virtualization layer. Upon acquiring the physical memory, the ring 0 driver may place the guest operating system (O/S) into a quiescent state and take control of hardware resources, such as one or more central processing units (CPUs) and devices (including security-critical devices), of the node. Specifically, the ring 0 driver may halt the hardware resources in a deterministic manner, and capture and save one or more architectural states (e.g., contents of registers) of the resources, which may be used to create a virtual machine having an initial state that is substantially identical to the states of the guest operating system and hardware resources executing on the node prior to deployment of the underlying virtualization layer.

In an embodiment, the late load technique may leverage a suspend function of the guest O/S to quiesce the node by, e.g., halting all activity of the resources, saving the states of the resources, bootstrapping the virtualization layer directly on the node (i.e., underneath the running guest O/S) and, thereafter, restoring the saved states of those resources while running in a virtual machine, so that the guest O/S is transparently reconstituted (i.e., without reboot to reconfigure the operating system state changes) in that virtual machine. That is, the suspend function of the guest O/S may be used to capture and save the states of the hardware resources, which thereafter may be restored as the state of the virtual machine created by the ring 0 driver. Illustratively, the suspend function may be modified so as to return control to the ring 0 driver after quiescing the guest operating system.

Upon quiescing the guest O/S and most of the hardware resources, the ring 0 driver may load the binaries of the virtualization layer into the acquired memory and bootstrap (activate) the virtualization layer to create the virtual machine having the captured state and associated hyper-processes, e.g., a guest monitor. The virtualization layer may then create a memory map where memory available to the virtual machine (e.g., guest-physical memory) is mapped to memory controlled by the virtualization layer (e.g., host-physical memory) excluding the physical memory allocated for the virtualization layer to thereby hide and protect the virtualization layer from the guest operating system. In an embodiment, the memory allocated to the virtualization layer by the guest O/S is pinned kernel mode memory dedicated to a pseudo device controlled by the ring 0 driver, so that effectively the memory is no longer managed (e.g., accessed) by the guest O/S.

Thereafter, the virtualization layer may initialize the hardware resources with a configuration specified by the virtualization layer and create virtual devices (such as virtual CPUs and virtual interrupt controllers) for those resources initialized with the captured states of the resources prior to activation of the virtualization layer (i.e., at a time of quiescing the guest O/S). The virtualization layer may then bootstrap the virtual machine, e.g., VM. The virtualization layer may pass any remaining resources (devices) directly through to the guest operating system and restart the virtual CPUs in the VM with their captured states. Accordingly, the guest O/S is reconstituted in the virtual machine to have a same state as when running directly on the node, because the pass-through devices retain their states and the virtual devices (e.g., virtual CPU) have an initial state identical to that of their physical counterparts (e.g., physical CPU) prior to activation of the virtualization layer. As a result, the virtualization layer is deployed underneath the guest operating system of the virtual machine and configured to control the hardware resources, thereby permitting enhanced security of the node.

DESCRIPTION

FIG. 1 is a block diagram of a network environment 100 that may be advantageously used with one or more embodiments described herein. The network environment 100 illustratively includes a plurality of computer networks organized as a public network 120, such as the Internet, and a private network 130, such an organization or enterprise (e.g., customer) network. The networks 120, 130 illustratively include a plurality of network links and segments connected to a plurality of nodes 200. The network links and segments may include local area networks (LANs) 110 and wide area networks (WANs) 150, including wireless networks, interconnected by intermediate nodes $200_I$ to form an internetwork of nodes, wherein the intermediate nodes $200_I$ may include network switches, routers and/or one or more malware detection system (MDS) appliances (intermediate node $200_M$). As used herein, an appliance may be embodied as any type of general-purpose or special-purpose computer, including a dedicated computing device, adapted to implement a variety of software architectures relating to exploit and malware detection functionality. The term "appliance" should therefore be taken broadly to include such arrangements, in addition to any systems or subsystems configured to perform a management function for exploit and malware detection, and associated with other equipment or systems, such as a network computing device interconnecting the WANs and LANs. The LANs 110 may, in turn, interconnect end nodes $200_E$ which, in the case of private network 130, may be illustratively embodied as endpoints.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent, general-purpose or special-purpose electronic device having network connectivity and, particularly for some embodiments, that may be configured to implement a virtualization system. The nodes 200 illustratively communicate by exchanging packets or messages (i.e., network traffic) according to a predefined set of protocols, such as the Transmission Control Protocol/Internet Protocol (TCP/IP); however, it should be noted that additional protocols, such as the HyperText Transfer Protocol Secure (HTTPS), may be advantageously used with the embodiments herein. In the case of private network 130, the intermediate node $200_I$ may include a firewall or other network device configured to limit or block certain network traffic in an attempt to protect the endpoints from unauthorized users. Unfortunately, such conventional attempts often fail to protect the endpoints, which may be compromised.

Figure 2:
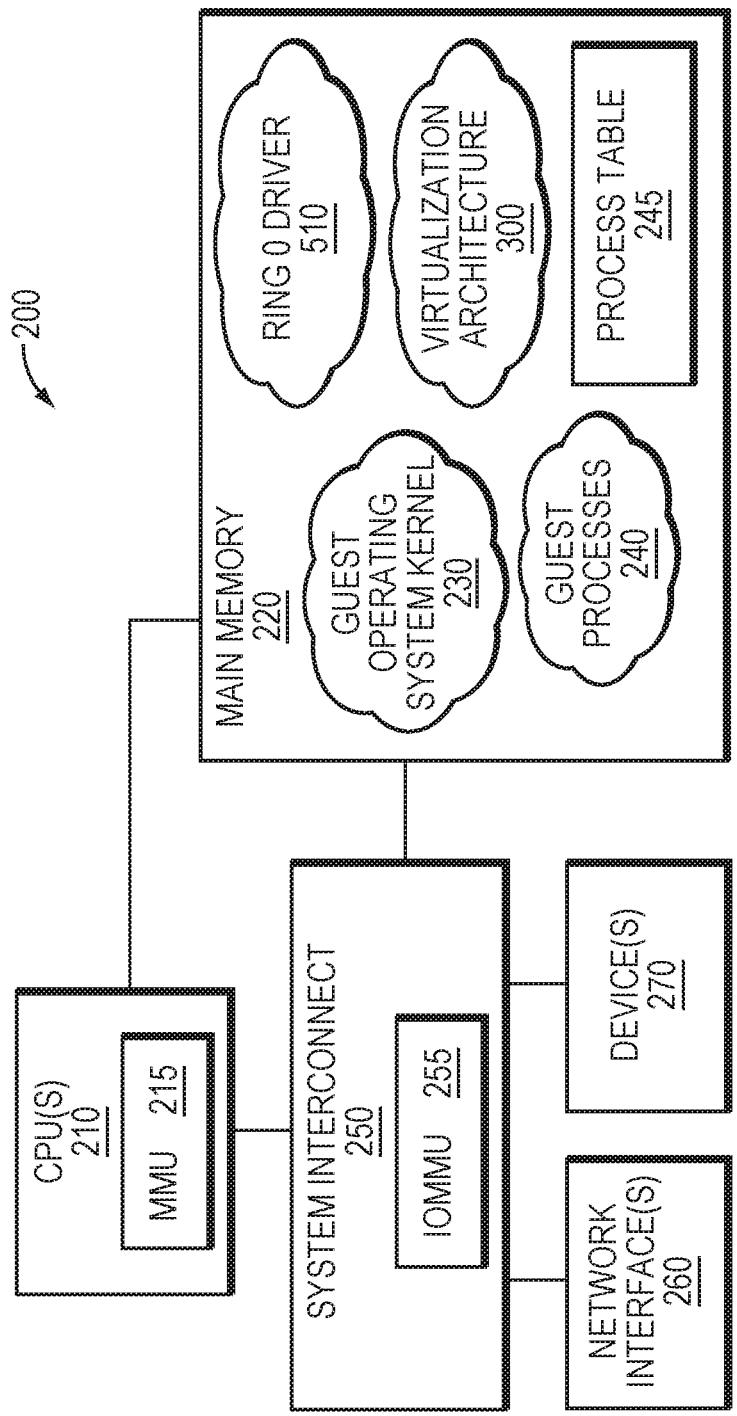
FIG. 2 is a block diagram of a node that may be advantageously used with one or more embodiments described herein.

FIG. 2 is a block diagram of a node 200, e.g., end node $200_E$ that may be advantageously used with one or more embodiments described herein. The node 200 illustratively includes one or more central processing unit (CPUs) 210 each having one or more CPU cores (not shown), a main memory 220, one or more network interfaces 260 and one or more devices 270 connected by a system interconnect 250. The devices 270 may include various input/output (I/O) or peripheral devices, such as storage devices, e.g., disks. The disks may be solid state drives (SSDs) embodied as flash storage devices or other non-volatile, solid-state electronic devices (e.g., drives based on storage class memory components), although, in an embodiment, the disks may also be hard disk drives (HDDs). Each network interface 260 may include one or more network ports containing the mechanical, electrical and/or signaling circuitry needed to connect the node to the network 130 to thereby facilitate communication over the network. To that end, the network interface 260 may be configured to transmit and/or receive messages using a variety of communication protocols including, inter alia, TCP/IP and HTTPS.

The memory 220 may include a plurality of locations that are addressable by the CPU(s) 210 via a memory management unit (MMU 215), as well as the network interface(s) 260 and device(s) 270 via an I/O MMU (IOMMU 255). Note that accesses to/from memory 220 by the CPU(s) 210 may occur directly through the MMU 215 without passing through the system interconnect 250, whereas accesses to/from the memory by the network interface(s) 260 and device(s) 270 may occur directly through the IOMMU 255 of the system interconnect. That is, a first data path may occur directly from the CPU to the memory 220 and a second (independent) data path may occur directly from the I/O devices 270 to the memory 220 via the system interconnect 270. The memory locations may be configured to store software program code (e.g., an operating system and application programs) and data structures associated with the embodiments described herein. The CPU 210 may include processing elements or logic adapted to execute the software program code, such as a ring 0 driver 510 and one or more modules of a virtualization architecture 300, and manipulate the data structures, such as a process table 245. Exemplary CPUs may include families of instruction set architectures based on the x86 CPU from Intel Corporation of Santa Clara, Calif., the x64 CPU from Advanced Micro Devices of Sunnyvale, Calif., and the ARM CPU from ARM Holdings, plc of the United Kingdom.

A (guest) operating system kernel 230, portions of which are typically resident in memory 220 and executed by the CPU, functionally organizes the node by, inter alia, invoking operations in support of the software program code and application programs executing on the node. A suitable guest operating system kernel 230 may include the Windows® series of operating systems from Microsoft Corp of Redmond, Wash., the MAC OS® and IOS® series of operating systems from Apple Inc. of Cupertino, Calif., the Linux operating system and versions of the Android™ operating system from Google, Inc. of Mountain View, Calif., among others. Suitable application programs may include Adobe Reader® from Adobe Systems Inc. of San Jose, Calif. and Microsoft Word from Microsoft Corp of Redmond, Wash. Illustratively, the software program code may be executed as guest processes 240 of the kernel 230. As used herein, a process (e.g., a guest process) is an instance of software program code (e.g., an application program) executing in the operating system that may be separated (decomposed) into one or more threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer applications or programs stored in memory, alternative embodiments may also include the code, processes and programs being embodied as components, logic, and/or modules consisting of hardware, software, firmware, or combinations thereof.

Virtualization Architecture

Figure 3:
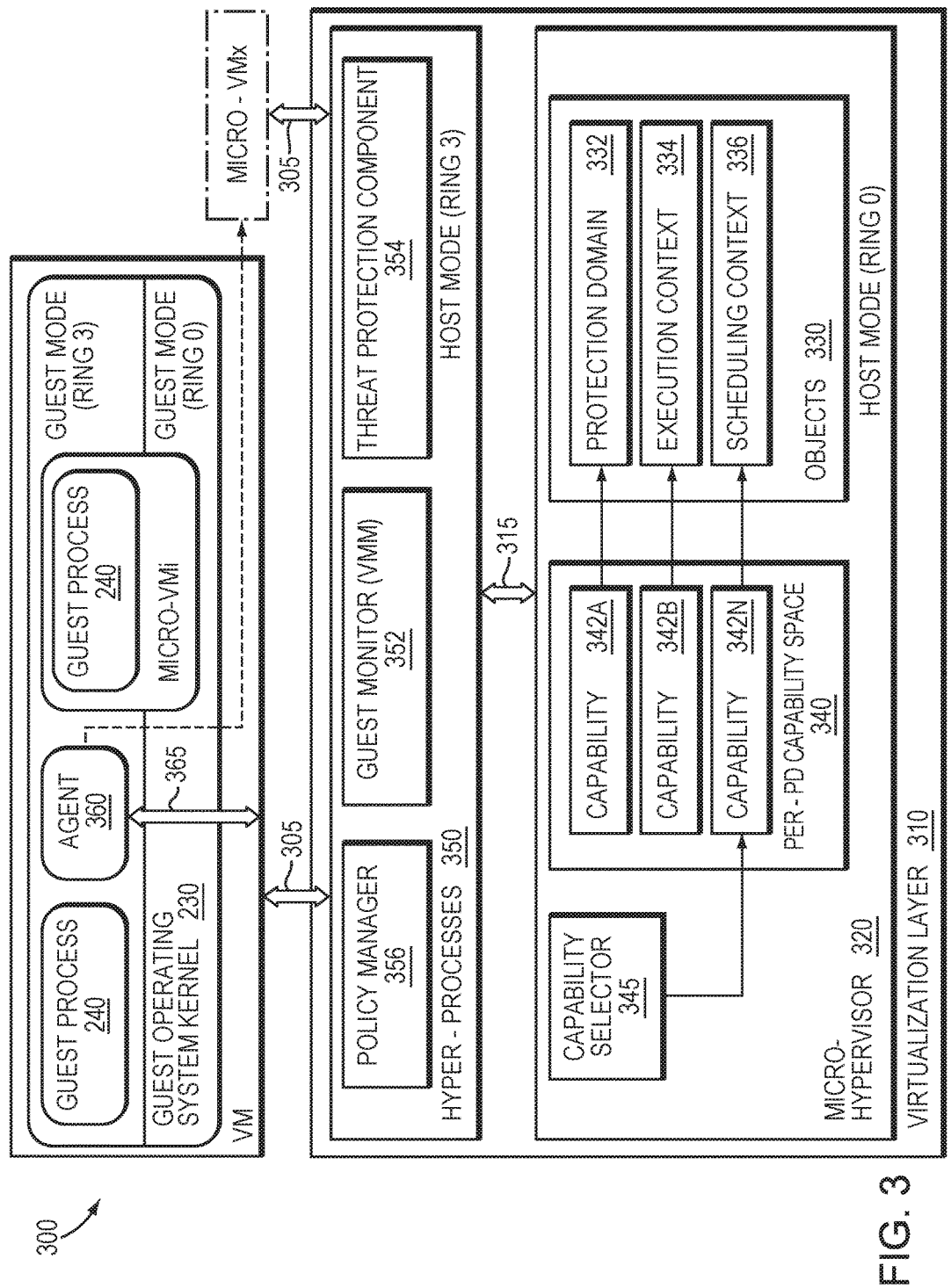
FIG. 3 is a block diagram of a virtualization architecture including a virtualization layer that may be advantageously used with one or more embodiments described herein.

FIG. 3 is a block diagram of a virtualization architecture 300 including a virtualization layer 310 that may be advantageously used with one or more embodiments described herein. The virtualization architecture 300 described herein is illustratively deployed in node 200 embodied as endpoint 200$_E$. The virtualization architecture 300 illustratively includes two privilege modes: guest mode and host mode. In an embodiment, a guest operating system (O/S) runs in the guest mode within a virtual machine, e.g., VM. The guest mode may employ a first set of four protection rings, e.g., guest mode rings 0-3, wherein one or more guest applications (guest processes 240) run in guest mode ring 3 at a lowest guest mode privilege level, and the guest operating system (guest operating system kernel 230) runs in guest mode ring 0 at a highest guest mode privilege level. The virtualization layer 310 operates in host mode of the virtualization architecture, which includes a second set of four protection rings, e.g., host mode rings 0-3. Illustratively, various user mode components embodied as hyper-processes 350 of the virtualization layer 310 run in host mode ring 3 at a lowest host mode privilege level, and a kernel portion (i.e., micro-hypervisor 320) of the virtualization layer runs in host mode ring 0 at a highest host mode privilege level.

The micro-hypervisor 320 (i.e., a type of hypervisor operating at a highest privilege level of a physical processor of the node) may be embodied as a light-weight module configured to facilitate run-time security analysis, including exploit and malware detection and threat intelligence, of the guest processes 240 executing on the node 200. As described herein, the micro-hypervisor 320 may cooperate with corresponding hyper-processes 350 of the virtualization layer 310 to virtualize the hardware and control privileges (i.e., access control permissions) to hardware resources of the node that are typically controlled by the guest operating system kernel. Illustratively, the hardware resources may include (physical) CPU(s) 210, memory 220, network interface(s) 260, and devices 270. The micro-hypervisor 320 may be configured to control access to one or more of the resources in response to a request by a guest process 240 to access the resource.

A user mode portion of the virtualization layer 310 includes the hyper-processes 350, examples of which include, inter alia, a guest monitor 352, a threat protection component 354, and a policy manager 356. The guest monitor 352 is illustratively a unique virtual machine monitor (VMM), i.e., a type 0 VMM, which includes virtualization functionality that cooperates with the micro-hypervisor 320 to virtualize the guest operating system within the VM and run one or more micro-virtual machines (micro-VMs), such as, in some embodiments, a memory view. Accordingly, the guest monitor 352 may include computer executable instructions executed by the CPU 210 to perform operations that spawn, configure, and control/implement the VM or any of a plurality of micro-VMs. The guest monitor 352 may further include virtualization functionality that emulates privileged instructions (i.e., an instruction emulator) and devices (i.e., a virtual device emulator) that act as software substitutes for hardware devices not directly assigned to the guest operating system. As such, a set of hardware resources may be virtualized among a plurality of micro-VMs that may access those resources. That is, the guest monitor 352 may create virtual devices (e.g., software state machines) of the hardware resources for use by the micro-VMs that, from the perspective of the guest operating system, appear as physical resources.

As used herein, the term "micro" VM denotes a virtual machine serving as a container that may be restricted to a single guest process (as opposed to the VM which is spawned as a container for the entire guest operating system having many guest processes). In one embodiment, the micro-VMx may be implemented outside of the VM, (i.e., in a separate protection domain) using, e.g., copy-on-write semantics. In another embodiment, the micro-VMi may be implemented inside the VM (i.e., inside a same protection domain as the VM) using, e.g., one or more memory views. However, whereas a micro-VM may be restricted to a single guest process, the hardware resources used by that micro-VM, such as memory, may be accessed by a plurality of micro-VMs (and their respective guest processes). As noted, there is only one virtual machine (e.g., the VM) per guest operating system on the endpoint. Typically, the guest operating system running in the VM has one "view" of the memory 220, i.e., "guest-physical" memory, corresponding to one nested page table. Accordingly, a same nested page table (i.e., memory view) may be used by a plurality of guest processes, each contained in a separate corresponding micro-VM that uses the same nested page table. However, additional views of memory may be created for each guest process, such as where every view corresponds to a different (i.e., separate) nested page table. Thus, different guest processes may view the guest-physical memory differently (e.g., with different translations or different permissions to the host-physical memory).

In an embodiment, the micro-VM may be implemented as such a view (i.e., a guest-physical memory view) of the memory 220, i.e., controlling the host-physical memory (hardware resource) underlying the guest-physical view of memory. Notably, different guest processes 240 may run in different micro-VMs, each of which is controlled by the (same) guest monitor 352 (also controlling the VM) to thereby enable a global view of execution activity in the guest operating system. The micro-VM thus has properties similar to the typical VM, but with less overhead, i.e., no additional guest monitors. In terms of execution, operation of the guest process is controlled and synchronized by the guest operating system kernel 230; however, in terms of access to hardware resources (managed in host mode), operation of the process is controlled by the guest monitor 352. Access to hardware resources may be synchronized among the micro-VMs and the VM by the guest monitor 352 rather than virtually shared. Notably, certain types of hardware resources, such as memory, may not need express synchronization among micro-VMs. For example, each CPU core may have a single memory view (i.e., set of nested page tables) active at a time, so that express synchronization among memory views is unnecessary. As such, memory views may be assigned to multiple micro-VMs with implicit synchronization.

In an embodiment, the privileged interfaces 305 and 315 may be embodied as a set of defined hyper-calls, each of which is an operation that explicitly calls (explicit transition) into the micro-hypervisor. The hyper-calls may originate from one or more hyper-processes 350 of the virtualization layer 310 and are directed to the micro-hypervisor 320 over the privileged interface 315; alternatively, bi-directional communications may originate from a protected component (e.g., an agent) in the guest operating system directed to the micro-hypervisor (virtualization layer) over the privileged interface 305. A transition from the guest operating system to the virtualization layer 310 is called a VM exit. Such a transition may be implicit, e.g., an intercepted operation or page-protection violation, or explicit, such as a VMCALL instruction from guest mode to host mode. Further, as used herein, an inter-process communication (IPC) message between two hyper-processes requires two hyper-calls (i.e., one for each process) for bi-directional communication.

The policy manager 356 may contain computer executable instructions executed by the CPU 210 to perform operations that associate a protection policy with each guest process 240. The threat protection component 354 may include instrumentation logic implemented as heuristics configured to determine the presence of an exploit or malware in any suspicious guest operating system process (kernel or user mode). To that end, the threat protection component 354 may include software program code (e.g., executable machine code) in the form of instrumentation logic (including decision logic) configured to analyze one or more interception points originated by one or more guest processes 240 to invoke the services, e.g., accesses to the hardware resources, of the guest operating system kernel 230. Illustratively, the threat protection component 354 may contain computer executable instructions executed by the CPU 210 to perform operations that initialize and implement the instrumentation logic.

As used herein, an interception point is a point in an instruction stream where control passes to (e.g., is intercepted by) the virtualization layer 310, e.g., the micro-hypervisor 320. Illustratively, the micro-hypervisor can intercept execution inside the guest operating system at arbitrary points such as (i) inside any guest process, (ii) inside the guest operating system kernel, and/or (iii) on transitions between guest processes and the guest operating system kernel. Malicious behavior may then be analyzed by the virtualization layer (e.g., the threat protection component 354), wherein the behavior may occur anywhere in the guest operating system, including in any guest process or in the guest operating system kernel. The virtualization layer 310 may, thus, place interception points at appropriate instruction stream points, whether in a process or in the kernel.

The guest operating system kernel 230 may be configured to include an operating system (OS) specific extension or agent 360 adapted to communicate with the threat protection component 354. The agent 360 illustratively contains executable machine code in the form of logic configured to provide an interface to the threat protection component 354 that allows introspection (examination and/or interception) of contents of internal structures of the guest operating system kernel 230, as well as semantic context associated with such contents. Such virtual machine introspection (VMI) may involve examination of data structures of the guest operating system kernel 230 in a manner that obviates duplication of (i.e., without copying) those structures between the guest and host modes of the virtualization architecture. To that end, the agent 360 may run in host mode ring 3 or guest mode ring 0; however, in an embodiment described herein, the agent 360 illustratively runs in guest mode ring 3. Accordingly, the agent 360 may contain computer executable instructions executed by the CPU 210 to perform operations that implement communication with, and introspection by, the threat protection component 354. For example, identification (ID) of each guest process 240 running in the guest operating system may be obtained from process IDs stored in a data structure, e.g., the process table 245, of the guest operating system. Accordingly, instead of having to know a location and format of that data structure, the threat protection component 354 can instruct the agent to examine the process table 245 and provide the ID of the guest process 240. That is, the agent 360 operating in the guest mode may act on behalf callers (e.g., guest monitor 352) operating in the host mode to access data structures in the guest mode. Alternatively, the threat protection component may examine directly the memory used by the guest O/S (i.e., virtual machine introspection) to determine locations (and layout) of the process table 245 so as to determine the ID of the guest process 240. Illustratively, threat protection component 354 may communicate with the guest operating system kernel 230 (i.e., the agent 360) over a defined application programming interface (API) 365.

As a light-weight module, the micro-hypervisor 320 may provide a virtualization layer having less functionality than a typical hypervisor. Therefore, as used herein, the micro-hypervisor 320 is a module that is disposed or layered beneath (underlying, i.e., directly on native hardware and operating at a highest privilege level of that native hardware) the guest operating system kernel 230 and includes the functionality of a micro-kernel (e.g., protection domains, execution contexts, capabilities and scheduling), as well as a subset of the functionality of a hypervisor (e.g., management of virtual CPUs and their states, management of the MMU, IOMMU and other security-critical devices, as well as hyper-calls to implement a virtual machine monitor). Accordingly, the micro-hypervisor 320 may cooperate with the guest monitor 352 to provide additional virtualization functionality in an operationally and resource efficient manner. Unlike a type 1 or type 2 VMM (hypervisor), the guest monitor 352 is illustratively a type 0 VMM (VMM) that need not fully virtualize the hardware resources of the node 200, while supporting execution of one entire operating system/instance inside one virtual machine, i.e., the VM. Illustratively, the VMM may either: (i) fully virtualize all hardware resources, (ii) virtualize only a first group of security-critical devices (e.g., CPU, MMU, IOMMU and interrupt controllers among others) and pass-through a remaining second group of non-security-critical devices; or (iii) virtualize a first group of devices and pass-through a second group of devices that are each assigned to a different VM. The guest monitor 352 may thus instantiate the VM as a container for the guest processes 240, as well as the guest operating system kernel 230 and its hardware resources. Illustratively, the guest monitor 352 is a pass-through module configured to expose the hardware resources of the node (as controlled by micro-hypervisor) to the guest operating system kernel 230. Yet, virtualization processing in response to a VM exit (and a resulting transition of control flow from the guest operating system to the micro-hypervisor) may be performed by the guest monitor. To that end, the micro-hypervisor may enable communication between the guest operating system (i.e., the VM) and the guest monitor over privileged interfaces 305 and 315.

In an embodiment, the micro-hypervisor 320 may include a plurality of data structures, such as objects 330 and capabilities 342, configured to provide security and isolation features associated with the virtualization architecture 300. Illustratively, the objects 330 include one or more protection domains 332, execution contexts 334 and scheduling contexts 336. As used herein, a protection domain 332 is a kernel mode object that implements spatial isolation among the hyper-processes of the virtualization layer and includes a representation of a security privilege associated with each hyper-process 350 that is enforced by the micro-hypervisor 320. Illustratively, each hyper-process 350 in the virtualization layer 310 runs in a separate protection domain 332. An execution context 334 is illustratively a representation of a thread associated with the hyper-process 350 and, to that end, defines a state of the thread for execution on the CPU 210. In an embodiment, the execution context 334 may include inter alia (i) contents of CPU registers, (ii) pointers/values on a stack, (iii) a program counter, and/or (iv) allocation of memory via, e.g., memory pages. The execution context 334 is thus a static view of the state of thread and, therefore, its associated hyper-process 350. For the thread to execute on a CPU, its execution context is tightly linked to a scheduling context 336, which may be configured to provide information for scheduling the execution context 334 for execution on the CPU 210. Illustratively, the scheduling context information may include a priority and a quantum time for execution of its linked execution context on CPU 210.

The micro-hypervisor 320 also includes a per-protection domain (PD) capability space 340 that contains capabilities 342A-N, wherein each capability 342 is a pointer to an object 330 having associated permissions (i.e., privileges). Hyper-processes 350 of the virtualization layer 310 do not have the ability to work with the capabilities 342 directly, i.e., they cannot read the pointer or privileges directly and can only refer to those capabilities using a capability selector 345, e.g., an integral number. To invoke a specific capability, a hyper-process 350, such as the guest monitor 352, may issue a hyper-call request (e.g., over interface 315) to the micro-hypervisor 320, wherein the request includes an action (e.g., "send a message" or "delegate a capability") along with a corresponding capability selector, i.e., an index such as N, that identifies (names) the object 330 involved in the hyper-call. Illustratively, the capabilities 342 are used to name the object on which the hyper-call operates and, at the same time, convey the access permissions of the calling hyper-process on that object. In response to the request, the micro-hypervisor may access the per-PD capability space 340 to select the requested capability 342N, which names (e.g., points to) the object (e.g., scheduling context 336) on which the action is performed.

Illustratively, a capability 342 is a concept that is only known in the virtualization layer 310, i.e., the guest operating system is unaware of the capability. The capability 342 is essentially a mechanism to enforce security privileges among the hyper-processes 350 of the virtualization layer 310. Notably, each hyper-process 350 is provided only a minimal set of capabilities 342 necessary for that component to perform its assigned function. For example, the guest monitor 352 may have the capability to access the VM, while only the threat protection component 354 may have the capability to communicate with the guest monitor 352 and policy manager 356. Thus, an attacker that is able to compromise a hyper-process (protection domain 332) would only be able to inflict damage associated with the capabilities 342 held by that protection domain 332.

As described herein, certain events or activities, e.g., attempted access to hardware resources, of a guest process 240 may be treated as interception points that allow the virtualization layer 310 to further monitor or instrument the process using a spawned micro-VM. A system call is an example of an interception point at which a change in privilege modes or levels occurs in the guest operating system, i.e., from guest mode ring 3 (a lowest level of guest mode privilege) of the guest process 240 to guest mode ring 0 (a highest mode of guest mode privilege) of the guest operating system kernel 230. The guest monitor 352 may intercept the system call and examine a state of the process issuing (sending) the call. The instrumentation logic of threat protection component 354 may analyze the system call to determine whether the call is suspicious and, if so, instruct the guest monitor 352 to instantiate (spawn) one or more micro-VMs, managed by the guest monitor in cooperation with the threat protection component, to detect anomalous behavior which may be used in determining an exploit or malware.

As used herein, an exploit may be construed as information (e.g., executable code, data, one or more commands provided by a user or attacker) that attempts to take advantage of a computer program or system vulnerability, often employing malware. Typically, a vulnerability may be a coding error or artifact of a computer program that allows an attacker to alter legitimate control flow during processing of the computer program by an electronic device and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed as computer code that is executed by an exploit to harm or co-opt operation of an electronic device or misappropriate, modify or delete data. Conventionally, malware may often be designed with malicious intent, and may be used to facilitate an exploit. For convenience, the term "malware" may be used herein to describe a malicious attack, and encompass both malicious code and exploits detectable in accordance with the disclosure herein.

Memory Virtualization

Figure 4:
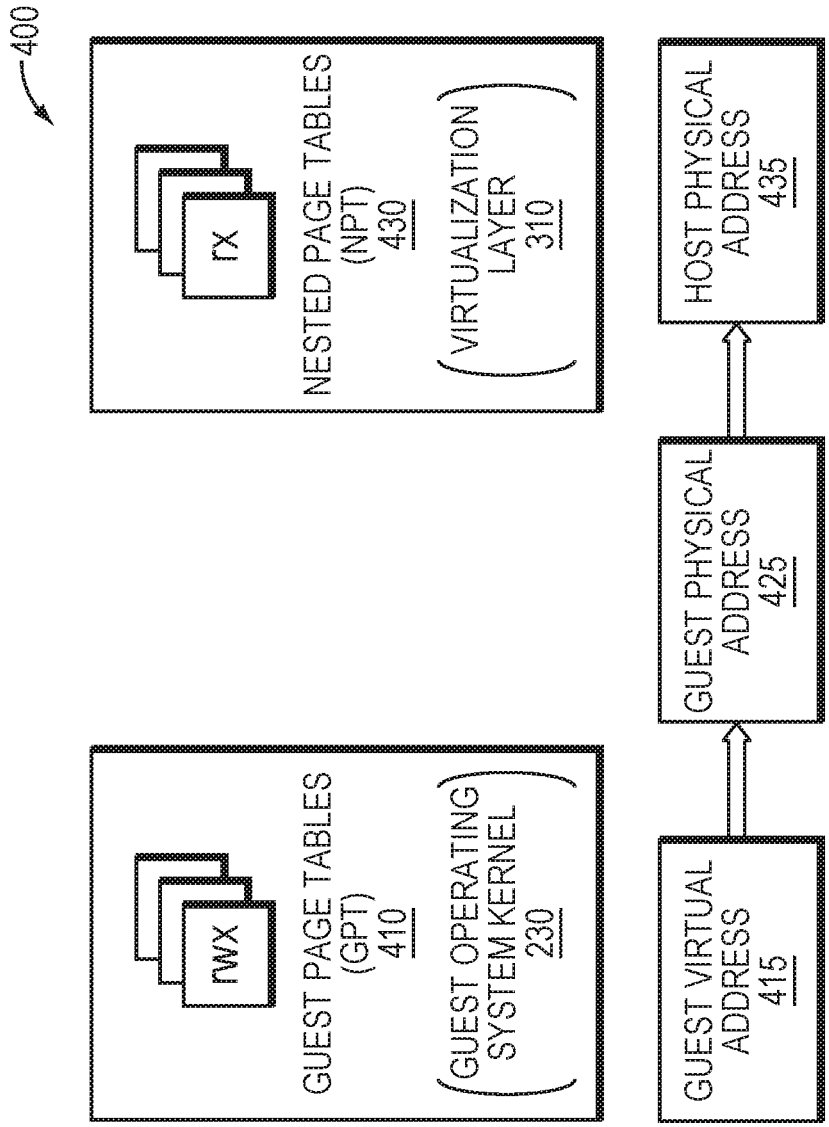
FIG. 4 is a block diagram illustrating memory virtualization that may be advantageously used with one or more embodiments described herein.

FIG. 4 is a block diagram illustrating memory virtualization 400 that may be advantageously used with one or more embodiments described herein. The guest operating system kernel 230 may create one or more sets of guest page tables (GPT) 410, wherein there is typically one set of guest page tables per guest process 240 that perform a first translation from a guest virtual (linear) address 415 to a guest-physical address 425. Each guest process 240 typically runs in its own address space of guest-virtual addresses; to that end, the guest operating system kernel 230 creates one or more guest page tables 410, e.g., in the form of a guest page table hierarchy, associated with the address space of the guest process 240. When switching guest processes for execution on the CPU 210 during a context switch, the guest operating system kernel 230 swaps a prior guest page table hierarchy (of a prior process) for the guest page table hierarchy of the (current) process to be executed.

Virtualization provides one or more additional page tables, i.e., nested page tables (NPT) 430, layered underneath (i.e., nested with) the GPT 410. The nested page tables 430 may be utilized to perform a second translation from the guest-physical address 425 to a host-physical address 435, wherein the host-physical address 435 is an address used to access (physical) main memory 220. The translation of guest-physical address 425 to host-physical address 435 may be flexible, i.e., such translation may be implemented on a per page basis to determine how each guest-physical address 425 is translated to a host-physical address 435. Illustratively, translation from guest-physical addresses to host-physical addresses is controlled by the virtualization layer 310 to establish a mapping from the guest-physical addresses used in a VM (e.g., the VM) to a host-physical address in main memory 220.

In an embodiment, guest page tables 410 are part of a guest page table hierarchy that is controlled by the guest operating system kernel 230, and the nested page tables 430 are part of a nested page table hierarchy that is controlled by the virtualization layer 310, e.g., managed by the microhypervisor 320 in cooperation with the guest monitor 352. In one arrangement where the MMU hardware supports nested paging, the page table hierarchies may be organized as a two-stage (i.e., layered) translation arrangement of the (physical) MMU 215 (supporting a virtualized MMU via two-level page table hierarchies), where the page tables define the translation of a guest-virtual address 415 to a guest-physical address 425 (a first stage defined by the GPT) and, ultimately, to a host-physical address 435 (a second stage defined by the NPT). There, the guest operating system kernel 230 manages the guest page tables 410, the virtualization layer 310 manages the nested page tables 430, and the nested page tables are consulted by the MMU after the guest page tables. Hence, the nested page tables may be used to override permissions.

In an alternative arrangement where the MMU hardware does not support nested paging (e.g., it can only perform one-level translation), the guest page tables may be organized as a shadow page table arrangement synchronized with the nested page table hierarchy such that the shadow page tables provide guest-virtual address to host-physical address translations that are updated with changes to the guest page table hierarchy or nested page table hierarchy. The virtualization layer 310 is responsible for folding the guest page tables 410 (managed by the guest operating system kernel 230) and the nested page tables 430 (managed by the virtualization layer) together to create the shadow page tables so as to perform end-to-end translation from guest-virtual addresses to host-physical addresses. The MMU 215 then uses the shadow page tables for translating guest-virtual addresses to host-physical addresses as a single level translation. Accordingly, the shadow page tables are updated when the guest page tables or nested page tables change. It should be noted that either arrangement may provide additional functionality, wherein each translation stage may define access permissions on a page granularity. That is, for each page referenced by a page table, access permissions may be specified as to whether the page is readable (r) writeable (w), or executable (x).

In an embodiment, the "ultra" (ultimate) translation to physical memory of the two-stage arrangement, i.e., the translation from guest-physical address 425 to host-physical address 435, may be employed to overwrite any page permissions that the guest operating system kernel 230 has defined. For example, assume the guest operating system kernel 230 has defined, using the GPT, a certain read (r), write (w), execute (x) mapping for a guest-virtual address 415 to guest-physical address 425 of a page accessible by a guest process 240, so that the guest process 240 may expect that it can actually read, write and execute that page. Yet, using the nested page tables 430 (i.e., layered beneath the GPT), the virtualization layer 310 may alter or change those permissions to be write protected, i.e., read-only (r) and execute (x) with no write permission, for the actual (host) physical page that the guest operating system kernel 230 (and guest process 240) may attempt to access. Therefore, any time that the guest process 240 attempts a write access to the page, an access violation of the nested page tables occurs, resulting in a VM exit (e.g., a transition) that returns control to the virtualization layer 310. Note that for the shadow page table arrangement, the violation occurs for a shadow page acting as a condensed two-stage address translation. In response to determining that the attempted write access is to a physical page that is write protected, the virtualization layer 310 may take action, such as emulating the access, making the page writeable, shadow copying the write, or completely nullifying the effects of that access. As another example, assume the guest operating system kernel 230 has marked the page as non-executable. The virtualization layer 310 may render the page executable or emulate the instruction that would have been executed if the page had been executed.

Late Load

The embodiments described herein provide a late load technique for deploying the virtualization layer underneath a running operating system executing on a node, such as an endpoint. Assume the operating system initially runs on the native hardware of the endpoint without the virtualization layer. The operating system, thus, has full control of the hardware resources, such that interrupts and direct memory access (DMA) transfers may be in progress, devices may be active, and one or more CPUs may be executing instructions. In other words, the operating system controls the entire hardware platform of the endpoint and manages (i.e., controls) the entire main memory as the state of the endpoint (and operating system) changes. Subsequently, it is desirable to deploy (slip) the virtualization layer underneath the running operating system so as not to disturb any existing operating system configuration and enable enhanced security available from the virtualization layer as previously described.

Figure 5:
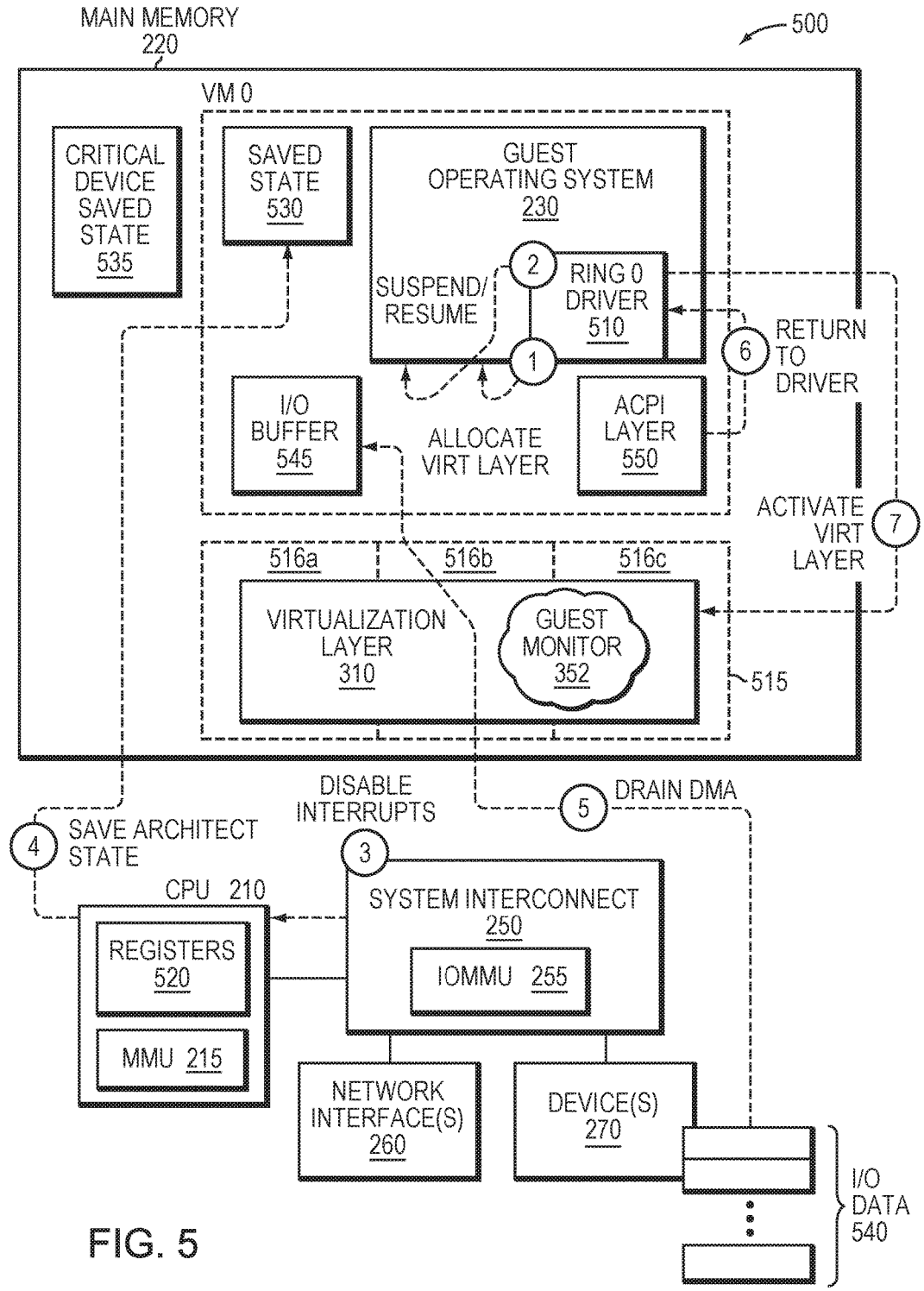
FIG. 5 is a block diagram of a late load technique for deploying a virtualization layer underneath an operating system executing on the node.

FIG. 5 is a block diagram of the late load technique 500 for deploying the virtualization layer 310 underneath an operating system executing on a node such as an endpoint. To deploy the underlying virtualization layer 310, a ring 0 driver 510 (e.g., a kernel module or kernel mode driver) having a highest privilege level of the operating system (hereinafter "guest operating system") is loaded in the memory 220 of the endpoint. In an embodiment, the ring 0 driver 510 may be installed in the guest operating system with the highest privilege level (e.g., a kernel mode driver in host mode ring 0) so as to allow the ring 0 driver to control the guest operating system and the hardware resources (e.g., stop the CPU and freeze a device). For example, a kernel mode driver may operate in ring 0 mode with ring 0 privileges of the Windows operating system, whereas a kernel module may be used to obtain such ring 0 privileges of the Linux operating system. The ring 0 driver may be loaded into memory 220 at any time when the guest operating system kernel 230 is engaged with active I/O operations, i.e., user processes and/or applications are running, while user I/O operations are in progress. Binary executable files (binaries) for the virtualization layer (e.g., the microhypervisor and hyper-processes) may be included in the ring 0 driver (i.e., binaries executed in the virtualization layer and not executed in the ring 0 driver); alternatively, the binaries may be loaded over the network 130 or from disk.

Once loaded, the ring 0 driver 510 may request allocation of physical memory 515 (e.g., a portion of main memory 220) from the guest operating system kernel 230 for the virtualization layer 310, e.g., via a memory allocation (kernel malloc) function of the guest operating system (denoted in FIG. 5 as indicator "1"). In an embodiment, the allocated physical memory 515 may include certain properties, such as (1) a non-direct memory accessible memory region, (2) a non-paging memory region, i.e., non-swappable to disk by the guest operating system, (3) a contiguous memory region to facilitate loading of the virtualization layer binaries, and (4) a reserved memory region, i.e., not accessed by the guest operating system after it is allocated. Illustratively, the physical memory allocated to the virtualization layer is embodied as a reserved, naturally-aligned contiguous region of physical memory, e.g., 4-8 megabytes or 0-8 megabytes of main memory, so that the virtualization layer may configure its page tables (NPT) with known fixed addresses in physical memory during boot. That is, in an embodiment, the physical memory 515 is allocated to the virtualization layer by the guest operating system as pinned kernel mode contiguous memory dedicated to a pseudo device controlled by the ring 0 driver, so that the memory is effectively no longer managed (i.e., accessed) by the guest operating system.

However, assume the guest operating system kernel 230 does not allow allocation of a physically contiguous memory region, but rather only allocates virtual memory via a limited number of virtual memory pages 516a-c at a time. According to the late load technique, the ring 0 driver 510 may employ an algorithm that requests allocation of a group of virtual memory pages 516 and then determines which of those pages, e.g., pages 516a-c, form a physically adjacent region 515 of memory sufficient for the virtualization layer binaries to reside in memory. Illustratively, the algorithm may examine virtual address descriptors within the guest operating system kernel to determine those pages 516 that point to the contiguous physical memory region 515 sufficient for accommodating the virtualization layer 310. The ring 0 driver may then retain those pages, release all other allocated pages and load the binaries at the contiguous physical memory region, which may be located anywhere in main memory, e.g., at any arbitrarily-aligned, physical address range. Accordingly, the virtualization layer 310 may be configured to be re-locatable within any arbitrarily-aligned contiguous region of physical memory.

The ring 0 driver 510 may then place the guest operating system into a quiescent state and take control of hardware resources, such as one or more CPUs 210 and devices (including security-critical devices such as interrupt controllers), of the node returning via a scheduler or a jump to an entry point of the ring 0 driver (denoted in FIG. 5 as indicator "2"). Specifically, the ring 0 driver may halt (freeze) the hardware resources in a deterministic manner, and capture and save one or more architectural states (e.g., contents of registers) of the resources, which may be used to create a virtual machine (VM) having an initial state that is substantially identical to the state of the node executing the guest operating system prior to deployment of the underlying virtualization layer. In an embodiment, the virtualization layer may provide the VM with direct access (i.e., pass through) to certain hardware devices, such as the network interface(s) 260. However, such direct access does not apply to the CPU 210 such that the virtualization layer 310 may gain control from the guest operating system kernel 230. Creation of the VM thus leads to creation of a virtual CPU resembling the physical CPU (i.e., behaves similar to the physical CPU) but that has a virtual (i.e., software controlled) state managed by the virtualization layer 310. Freezing (i.e., halting) of the CPU 210 therefore denotes placing the CPU in a controlled state where its registers 520 (and architecture in general) may be captured (e.g., via a snapshot operation) and saved to a portion of memory 220, thereby enabling the virtual CPU having the captured state from the (physical) CPU 210 to be recreated in the VM at a later time (e.g., restored as an initial state of the VM).

In an embodiment, the architectural states captured by freezing the CPU 210 may include, inter alia, the execution context states of the CPU registers, stack, and program counter, such that an environment of the VM may be recreated substantially similar to the environment that existed on the native hardware at the time of deployment of the virtualization layer 310. Illustratively, all CPU registers 520 (e.g., floating point unit registers, MMX registers, SSE registers, AVX registers and the like) may be captured including, e.g., the CPU core registers and memory management unit (MMU) registers to a saved state 530. More generally, any architectural state that cannot otherwise be preserved when the virtualization layer activates (e.g., the states of devices and interrupt controllers that change when initialized by the virtualization layer) is also captured and saved to the saved state 530. The saved state 530 is illustratively stored in a protected (i.e., isolated from the guest operating system) portion of the memory 220; however in an alternative embodiment, the saved state 530 may be persistently stored on a storage device of the devices 270. Devices initialized by the virtualization layer include various security-critical devices, such as the CPU(s) 210, MMU 215 and IOMMU 255 (i.e., any device related to interrupt delivery). Any portion of the memory 220 that is not accessed (touched) during the boot procedure of the virtualization layer (e.g., I/O buffer 545) may remain in place and, thus, need not be preserved when the virtualization layer activates. In addition to the CPU registers and devices initialized by the virtualization layer, the states of interrupt controllers (including those controllers programmed by the guest operating system kernel 230) are captured and saved for recreation in the VM (i.e., the initial state of the VM).

Capturing of the architectural state may be achieved by halting all activities of the various hardware devices (including the CPUs) in a way that their states do not change during the capture (i.e., non-destructive capture), such as disabling interrupts (denoted in FIG. 5 as indicator "3"). The ring 0 driver 510 may halt such activities by, e.g., forcing the CPUs to execute a loop (or halt) instruction, such that their architectural registers may be non-destructively read and saved. Illustratively, any DMA operation transfers already initiated by the hardware devices may be allowed to complete (drain) prior to reaching the deterministic state, e.g., I/O data 540 in-flight to I/O buffer 545. In addition, because of the asynchronous nature of DMA operations, i.e., it is undetermined precisely when the in-flight operations (e.g., DMA of I/O data 540) will complete (e.g., stored to I/O buffer 545), a time period for completion may be established where a threshold, e.g., 5 seconds, may be provided for completion of the DMA transfers. Alternatively, in-flight DMA operations may be allowed to continue as long as they do not access a memory region reserved for the virtualization layer 310 and, thus, do not obstruct the virtualization layer bootstrap (activation) procedure (e.g., DMA to I/O buffer 545 which is disjoint from memory 515 allocated to the virtualization layer).

In an embodiment, the late load technique may leverage a guest operating system suspend function and resume function to quiesce the node (endpoint) by, e.g., halting all activity of the hardware resources, saving the states of the resources while running directly on the node (i.e., underneath the running guest operating system) and, thereafter (i.e., once the guest operating system is running in the VM), restoring (resume) the saved states of those resources (denoted in FIG. 5 as indicator "2") so that the guest operating system is transparently reconstituted (i.e., without reboot to reconfigure the operating system state changes) in that virtual machine. That is, the suspend function may be used to capture and save the states of the hardware resources, which thereafter may be restored as the initial state of the VM using the resume function. The suspend and resume functions are specified according to the Advanced Configuration and Power Interface (ACPI) specification, available from *The Unified Extensible Firmware Interface forum* (UEFI) collaborative trade association at www.uefi.org, developed to establish industry common interfaces enabling robust operating system-directed device configuration and power management of devices and entire systems. Illustratively, a platform specific ACPI layer 550 cooperates with the guest operating system kernel 230 to implement the suspend/resume function.

The late load technique may leverage the suspend and resume functions by triggering a suspend event that directs the guest operating system kernel 230 to suspend (i.e., cease operation) and save (i.e., capture) the states of the resources (including the security-critical devices) and, thereafter, trigger a resume event to restore those states in the VM. For example, an application programming interface (API) of the guest operation system may be available to activate the suspend and resume functions (i.e., execute suspend and resume code) such that the guest operating system kernel performs the work of capturing and saving of the states of the hardware resources and later restoring those states on behalf of the virtualization layer. After the suspend completes, the CPU(s) 210 are halted such that control passes to the platform ACPI layer which awaits a resume event to continue operation of the node. In an embodiment where the guest operating system does not have the suspend and resume API exposed or cannot otherwise trigger such an event, the suspend and resume functions may be triggered manually (e.g., by user invoking a hardware trigger of the suspend function). Illustratively, the suspend and resume functions of guest operating system and/or ACPI layer may be modified (a first modification) so as to return control to the ring 0 driver 510 after completing the suspend rather than returning control to the ACPI layer 550 (denoted in FIG. 5 as indicator "7"). Accordingly, the suspend and resume code of the guest operating system (and/or the ACPI layer) is further modified (a second modification) so that at least one CPU core is not shut down, allowing control to be returned to the (still running) CPU core. Notably, using the suspend function triggered within the guest operating system ensures that pending (e.g., in-flight) DMA operations complete according to the states of the devices 270 as managed by the guest operating system, thereby ensuring no I/O data is lost and operation of the node appears seamless upon a later resume.

In an alternative embodiment, the late load technique may use the ring 0 driver to direct the guest operating system kernel 230 to suspend (i.e., cease operation) and save (i.e., capture) the states of the resources and, thereafter, restore those states in the VM.

After saving the states of all CPUs (except the CPU core on which the late load of the virtualization layer is performed) and acquiring a physically contiguous region 515 of memory at which the virtualization layer may reside, the ring 0 driver may suspend all hardware devices initialized by the virtualization layer in order to save their states. All other hardware devices may continue to retain their states after the virtualization layer boots (activates), because pass-through access is provided to all non-security critical devices for the guest operating system kernel 230 of the VM, i.e., drivers of the guest operating system kernel can directly access those hardware devices. However, for the security critical devices (such as interrupt controllers, MMU and IOMMU) the states are extracted from those hardware devices and saved in a portion of memory, e.g., a critical device saved state 535, illustratively organized as an agnostic data structure for consumption by the virtualization layer 310. Notably, the critical device saved state portion of memory may differ from the saved state 530, which is accessible by the guest operation system and/or ACPI layer. Accordingly, memory pages of the critical device saved state 535 may be isolated and later (after activation) protected by the virtualization layer as described further herein for protecting the memory 515 allocated for the virtualization layer.

Upon acquiring the physical memory, the ring 0 driver 510 may load the binaries of the virtualization layer 310 into the acquired memory and bootstrap (activate) the virtualization layer to create the virtual machine (VM) having the captured state and associated hyper-processes, e.g., a guest monitor (VMM). The virtualization layer may then create a memory map where memory controlled by the VM (e.g., guest-physical memory) is mapped (e.g., one-to-one) to memory controlled by the virtualization layer (e.g., host-physical memory) except for the physical memory allocated for the virtualization layer to thereby hide the virtualization layer from the guest operating system. That is, the virtualization layer 310 may remap the guest-physical address layout of its memory region to hide the virtualization layer (including fixing up memory regions) from the guest operating system to ensure that the guest operating system cannot access (i.e., touch) that region. As previously described, the allocated memory for the virtualization layer may be pinned kernel mode memory dedicated to a pseudo device controlled by the ring 0 driver, so that the memory is no longer managed (e.g., accessed) by the guest O/S. Illustratively, for a node lacking an IOMMU, the one-to-one mapping results in identical address mapping that further ensures that at the time the guest operating system and the VM resume, any DMA operation transfers are directed to proper memory locations. Thus there is no remapping of memory for the guest operating system except to hide the virtualization layer, i.e., ensure that the acquired physical memory is not available to the guest operating system for inspection, modification and execution. Alternatively, the one-to-one mapping is not required for a node having an IOMMU, which provides guest-physical to host-physical memory mapping used by the virtualization layer.

Specifically, the virtualization layer may ensure that the acquired physical memory is not available to the guest operating system for modification by modifying the NPT 430 to prevent access by the guest operating system (VM) to that memory, thus essentially "unplugging" that memory from use by the guest operating system. If the guest operating system subsequently attempts to access pages of the allocated memory region, a page fault (NPT) violation may be triggered and handled by the virtualization layer as, e.g., an attempt to access non existing physical memory, such that a response to the attempted access returns all ones (a floating bus indicating that the memory pages are non-existent) or redirects the attempted access to different memory pages of the guest operating system.

Thereafter, the virtualization layer 310 may initialize the hardware resources with a configuration specified by the virtualization layer and create (emulate) virtual devices (such as virtual CPUs) for those resources initialized with the captured states of the resources prior to activation (e.g., bootstrap) of the virtualization layer. For example, the guest monitor (VMM) may read the content of the saved states and data structures (e.g., CPUs states, interrupt controller states) and emulate virtual devices having states identical to the states existing at the time of deployment of the virtualization layer. Illustratively, emulation of the virtual devices may occur for all devices that do not have hidden internal states, such as interrupt controllers, the MMU, the IOMMU and CPUs wherein extraction of states is possible. The virtualization layer may then bootstrap the VM. All virtual CPUs are initialized to their saved registers (i.e., captured from the suspend function) such that execution in the VM continues where the guest operating system left off when running on native hardware at the time of deployment (i.e., at a time of the guest O/S suspend) of the virtualization layer. Note that the CPU core used to create the VM and VMM continues running (e.g., after the instruction jump to the virtualization layer) in the ring 0 driver 510 such that the virtualization layer 310 can perform any post-virtualization layer launch cleanup, including triggering a resume event or releasing previously allocated memory pages. As noted, the suspend and resume functions are modified so as to return control to the ring 0 driver after suspending the guest operating system.

The virtualization layer may pass the states of any remaining resources (devices) directly through to the guest operating system and restart the virtual CPUs in the VM with their initialized states. As a result, the virtualization layer is deployed underneath the guest operating system of the virtual machine and configured to control the hardware resources, thereby permitting enhanced security of the node.

Figure 6:
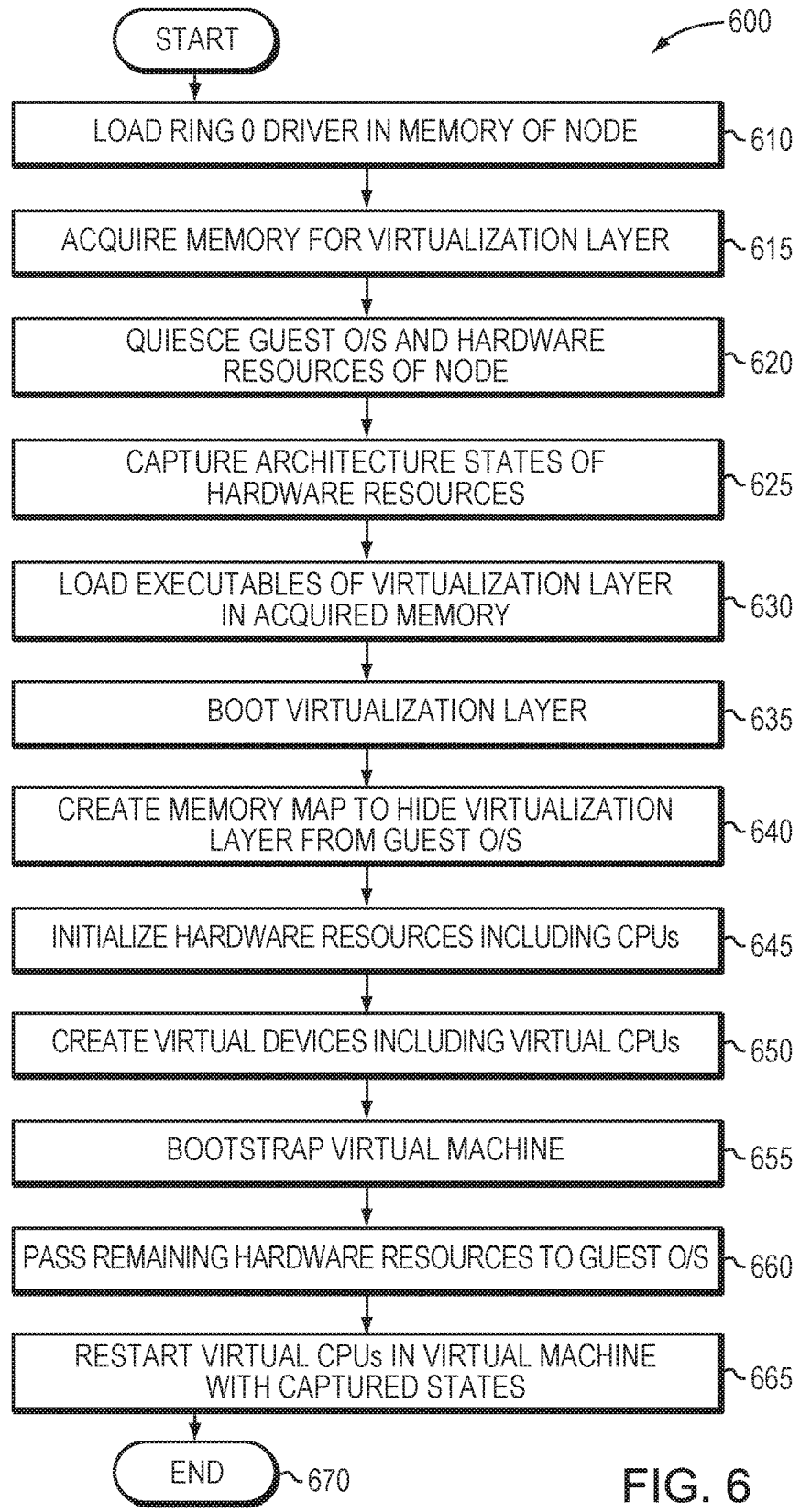
FIG. 6 is an example simplified procedure for deploying the virtualization layer underneath the operating system executing on the node.

FIG. 6 is an example simplified procedure for deploying the virtualization layer underneath an operating system executing on a node such as an endpoint. The procedure 600 starts at step 605 and proceeds to step 610 where, to deploy the underlying virtualization layer, the ring 0 driver is loaded in memory of the node. As noted, the ring 0 driver illustratively has a highest privilege level of the guest operating system and includes binaries for the virtualization layer. At step 615, the ring 0 driver acquires physical memory, e.g., from the guest operating system for the virtualization layer. At step 620, the ring 0 driver quiesces the guest operating system and hardware resources, such as one or more central processing units (CPUs) and devices (including security-critical devices), of the node. At step 625, the ring 0 driver captures (and saves) the architectural states of the resources, e.g., to allow creation of the virtual machine (VM) with an initialized state that is substantially identical to the state of the guest operating system executing on the node prior to deployment of the underlying virtualization layer.

At step 630, the ring 0 driver loads the binaries of the virtualization layer into the acquired memory and, at step 635, bootstraps (activates) the virtualization layer, e.g., to create the virtual machine and associated hyper-processes, e.g., a guest monitor. At step 640, the virtualization layer creates a memory map to hide the virtualization layer from the guest operating system, e.g., to map memory controlled by the virtual machine (e.g., guest-physical memory) to memory controlled by the virtualization layer (e.g., host-physical memory) except for the physical memory allocated for the virtualization layer. At step 645, the virtualization layer initializes the hardware resources (including CPUs) with its own configuration and, at step 650, creates virtual devices (including virtual CPUs) for those resources, e.g., initialized with the states of the resources prior to deployment of the virtualization layer. At step 655, the virtualization layer bootstraps the virtual machine. At step 660, the virtualization layer passes any remaining resources (devices) directly through to the guest operating system and, at step 665, restarts the virtual CPUs in the VM with their initialized states. At step 670, the procedure ends with the virtualization layer deployed underneath the guest operating system of the virtual machine and configured to control the hardware resources.

While there have been shown and described illustrative embodiments for deploying a virtualization layer underneath an operating system executing on a node of a network environment to enable the virtualization layer to control the operating system, it is to be understood that various other adaptations and modifications may be made within the spirit and scope of the embodiments herein. For example, embodiments have been shown and described herein with relation to quiescing of the endpoint and halting device activity (e.g., stopping device drivers) within the guest operating system using the suspend function of the guest operating system. However, the embodiments in their broader sense are not so limited, and may, in fact, enable quiescing of the endpoint by guest operating systems that do not support suspend/resume, i.e., there is no exposed suspend and resume API which the ring 0 kernel driver could invoke. To ensure that such a guest operating system is placed in a quiescent state when there is no ongoing DMA transfers or interrupt activity, all timers may be disabled to ensure that no interrupts are generated. Further, it is contemplated that the ring 0 driver may wait a sufficient period of time for any on-going DMA transfers to drain after the device drivers have stopped or halted. Notably, the DMA may be disabled in response to booting (activation) of the virtualization layer, which may cause all DMA activity to halt until the guest monitor re-enables DMA for the guest operating system. Note that the virtualization layer need only protect its own memory region, i.e., the allocated memory from the guest operating system storing the virtualization layer, (and not all memory) against such activity; accordingly, certain DMA transfers may remain in flight for the entire late load technique.

Moreover, certain guest operating systems, e.g., the Windows operating system, may use watch dog timers to detect excessive system suspend durations that trigger a system error (blue screen), which may occur during the activation period of the virtualization layer. One solution to this problem is to disable all timers (timing sources) of the guest operating system such that the operating system has no concept of time. Another solution is to take a snapshot of the current time from a watch dog timing source, e.g., a real-time clock (RTC), a time stamp counter (TSC) or, illustratively, a high precision event timer (HPET), while the ring 0 driver is saving the states of the hardware devices. As part of saving the states of the interrupt controllers, all interrupts may be masked to ensure that no interrupt activity can occur. Thus even if a timer expires, the corresponding interrupt is not fired (generated). Illustratively, when the virtualization layer boots, a second snapshot of the current time may be taken to determine the amount of time (i.e., time delta) needed to bootstrap the virtualization layer. The virtualization layer may then intercept a virtualized watch dog timing source and adjust (subtract) the time delta when the guest operating system attempts to access the timing source, thus preventing the guest operating from detecting an excessive suspend duration.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   acquiring, by a ring 0 driver executing on a node, physical memory from a guest operating system executing on a central processing unit (CPU) of the node, the CPU coupled to a memory and to a plurality of hardware resources;
   suspending, by the ring 0 driver executing on the node, the guest operating system and the hardware resources to a first state, the ring 0 driver, residing in the guest operating system, having a highest privilege level of the guest operating system;
   capturing and saving states of the hardware resources by the ring 0 driver executing on the node;
   loading, by the ring 0 driver executing on the node, binary executables for a virtualization layer into the acquired physical memory; and
   bootstrapping, by the ring 0 driver executing on the node, the virtualization layer to create a virtual machine with an initial state that corresponds to a state of the node executing the guest operating system prior to deployment of the virtualization layer, including the captured states of the hardware resources.

2. The method of claim 1 wherein the virtualization layer provides pass-through virtualization for the plurality of hardware resources excluding security-critical devices that include the CPU and a memory management unit (MMU) coupled to the memory, the MMU supporting a guest page table and a nested page table, and wherein the CPU is coupled to the MMU.

3. The method of claim 2 further comprising:
   creating a memory map, wherein memory controlled by the virtual machine is mapped to memory controlled by the virtualization layer excluding the physical memory for the virtualization layer, thereby ensuring that the acquired physical memory is not available to the guest operating system for inspection, modification and execution.

4. The method of claim 3 wherein the virtualization layer modifies the nested page table to prevent access by the guest operating system to the acquired physical memory.

5. The method of claim 4 further comprising:
   initializing the hardware resources with a configuration specified by the virtualization layer, wherein the security-critical devices include an input/output MMU (IOMMU); and
   creating virtual devices for the hardware resources initialized with the captured states of the hardware resources, being captured architectural states of the hardware resources, prior to bootstrap of the virtualization layer, the virtual devices including a virtual CPU.

6. The method of claim 5 further comprising:
   bootstrapping the virtual machine; and
   restarting the virtual CPU in the virtual machine initialized with the captured architectural states.

7. The method of claim 1 wherein a guest operating system suspend function is used to capture and save the states of the hardware resources.

8. The method of claim 1 wherein a guest operation system resume function is used to restore the initial state of the virtual machine.

9. The method of claim 7 wherein a core of the CPU remains operating after suspending the guest operating system such that control passed to ring 0 driver.

10. A system comprising:
    a memory configured to store a guest operating system including a ring 0 driver having a highest privilege level of the guest operating system and a virtualization layer, the ring 0 driver including binary executables for the virtualization layer; and a plurality of hardware resources coupled to the memory, the hardware resources including a central processing unit (CPU) adapted to execute the ring 0 driver, the ring 0 driver when executed operable to:
acquire physical memory from the guest operating system for the virtualization layer;
suspend the guest operating system and the hardware resources to a quiescent state;
capture and save states of the hardware resources;
load the binary executables for the virtualization layer into the acquired physical memory; and
bootstrap the virtualization layer to create a virtual machine with an initial state that corresponds to a state of the system prior to deployment of the virtualization layer, including the captured states of the hardware resources.

11. The system of claim 10 wherein the hardware resources further include:
a memory management unit (MMU) coupled to the memory, the MMU supporting a guest page table and a nested page table, wherein the CPU is coupled to the MMU, and wherein the virtualization layer provides pass-through virtualization for the plurality of hardware resources excluding the CPU and MMU.

12. The system of claim 11 wherein the CPU is further adapted to execute the virtualization layer, the virtualization layer when executed operable to:
create a memory map wherein memory controlled by the virtual machine is mapped to memory controlled by the virtualization layer excluding the physical memory for the virtualization layer, thereby ensuring that the acquired physical memory is not available to the guest operating system for modification.

13. The system of claim 12 wherein the virtualization layer, when executed to ensure that the acquired physical memory is not available to the guest operating system for modification, is further operable to modify the nested page table to prevent access by the guest operating system to the acquired physical memory.

14. The system of claim 12 wherein the hardware resources further include:
an input/output MMU (IOMMU) and one or more devices, the IOMMU adapted to couple each device to the memory such that accesses to and from the memory by the device occurs directly through the IOMMU, and wherein the virtualization layer excludes the IOMMU from pass-through virtualization.

15. The system of claim 14 wherein the virtualization layer when executed is further operable to:
initialize the hardware resources with a configuration specified by the virtualization layer, wherein the hardware resources include the CPU, MMU and IOMMU; and
create virtual devices for the hardware resources initialized with the captured states of the hardware resources, being captured architectural states of the hardware resources, prior to bootstrap of the virtualization layer, the virtual devices including a virtual CPU.

16. The system of claim 15 wherein the virtualization layer when executed is further operable to:
bootstrap the virtual machine; and
restart the virtual CPU in the virtual machine with the captured architectural state.

17. The system of claim 10 wherein a guest operating system suspend function is used to capture and save the architectural states of the resources.

18. The system of claim 10 wherein a guest operation system resume function is used to restore the initial state of the virtual machine.

19. The system of claim 17 wherein a core of the CPU remains operating after suspending the guest operating system such that control passed to ring 0 driver.

20. A non-transitory computer readable medium including program instructions for execution within a node including a central processing unit (CPU) coupled to a memory and coupled to a plurality of hardware resources, the program instructions when executed operable to:
acquire, by a ring 0 driver, physical memory from a guest operating system executing on the CPU, the ring 0 driver, residing in the guest operating system, having a highest privilege level of the guest operating system;
suspend, by the ring 0 driver, the guest operating system and the hardware resources to a quiescent state;
capture and save, by the ring 0 driver, states of the hardware resources;
load by the ring 0 driver, binary executables, for a virtualization layer into the acquired physical memory; and
bootstrap, by the ring 0 driver, the virtualization layer to create a virtual machine with an initial state that corresponds to a state of the node executing the guest operating system prior to deployment of the virtualization layer, including the captured states of the hardware resources.

* * * * *